United States Patent
Buchman et al.

(10) Patent No.: US 8,832,030 B1
(45) Date of Patent: Sep. 9, 2014

(54) SHAREPOINT GRANULAR LEVEL RECOVERIES

(75) Inventors: Matthew Buchman, Seattle, WA (US); Jerzy Gruszka, Lacey, WA (US); Troy Thompson, Bellevue, WA (US)

(73) Assignee: EMC Corporation, Hopkinton, MA (US)

( * ) Notice: Subject to any disclaimer, the term of this patent is extended or adjusted under 35 U.S.C. 154(b) by 28 days.

(21) Appl. No.: 13/173,524

(22) Filed: Jun. 30, 2011

(51) Int. Cl.
*G06F 17/30* (2006.01)

(52) U.S. Cl.
USPC ......................................... 707/650

(58) Field of Classification Search
CPC ............ G06F 11/1469; G06F 11/1451; G06F 11/1435
USPC ......................................... 707/650
See application file for complete search history.

(56) References Cited

U.S. PATENT DOCUMENTS

| | | | |
|---|---|---|---|
| 2009/0307449 A1* | 12/2009 | Prahlad et al. | 711/162 |
| 2010/0174683 A1* | 7/2010 | Freeman et al. | 707/650 |
| 2011/0087874 A1* | 4/2011 | Timashev et al. | 713/100 |

OTHER PUBLICATIONS

VMware, VMware Data Recovery 1.0 Evaluator's Guide, 2009, VMware Inc., Revision: Jul. 30, 2009, pp. 1-24.*

* cited by examiner

*Primary Examiner* — Rehana Perveen
*Assistant Examiner* — Alexander Khong
(74) *Attorney, Agent, or Firm* — Van Pelt, Yi & James LLP

(57) ABSTRACT

A method for restoring a content management system is disclosed. A virtual file system exposing backup data of a content management system stored in a backup data storage is created. The backup data is exposed without retrieving the backup data from the backup data storage. A selection of a portion of the backup data to be restored to the content management system is received via an interface associated with the virtual file system. The selected portion of the backup data is caused to be granularly restored to the content management system without restoring one or more unselected portions of the backup data.

17 Claims, 5 Drawing Sheets

SHAREPOINT GRANULAR LEVEL RECOVERIES

BACKGROUND OF THE INVENTION

Content management systems enable people to work efficiently together. For example, content management systems allow people belonging to an organization or a group to manage workflows in a collaborative environment, set up web sites to share information with others, manage documents from start to finish, or publish reports to help the organization make better decisions.

The contents and data of a content management system can be lost after a data loss event. Restoring lost data in a content management system can be performed in a number of ways. One approach is to perform an image-based full restore. In an image-based full-restore, all the content databases and configuration databases are restored at once. However, during the full-restore, the availability of the content management system to the users of the system will be compromised. Since doing a full-restore is time-consuming, the content management system can potentially be down for a long time.

BRIEF DESCRIPTION OF THE DRAWINGS

Various embodiments of the invention are disclosed in the following detailed description and the accompanying drawings.

DETAILED DESCRIPTION

Figure 1:
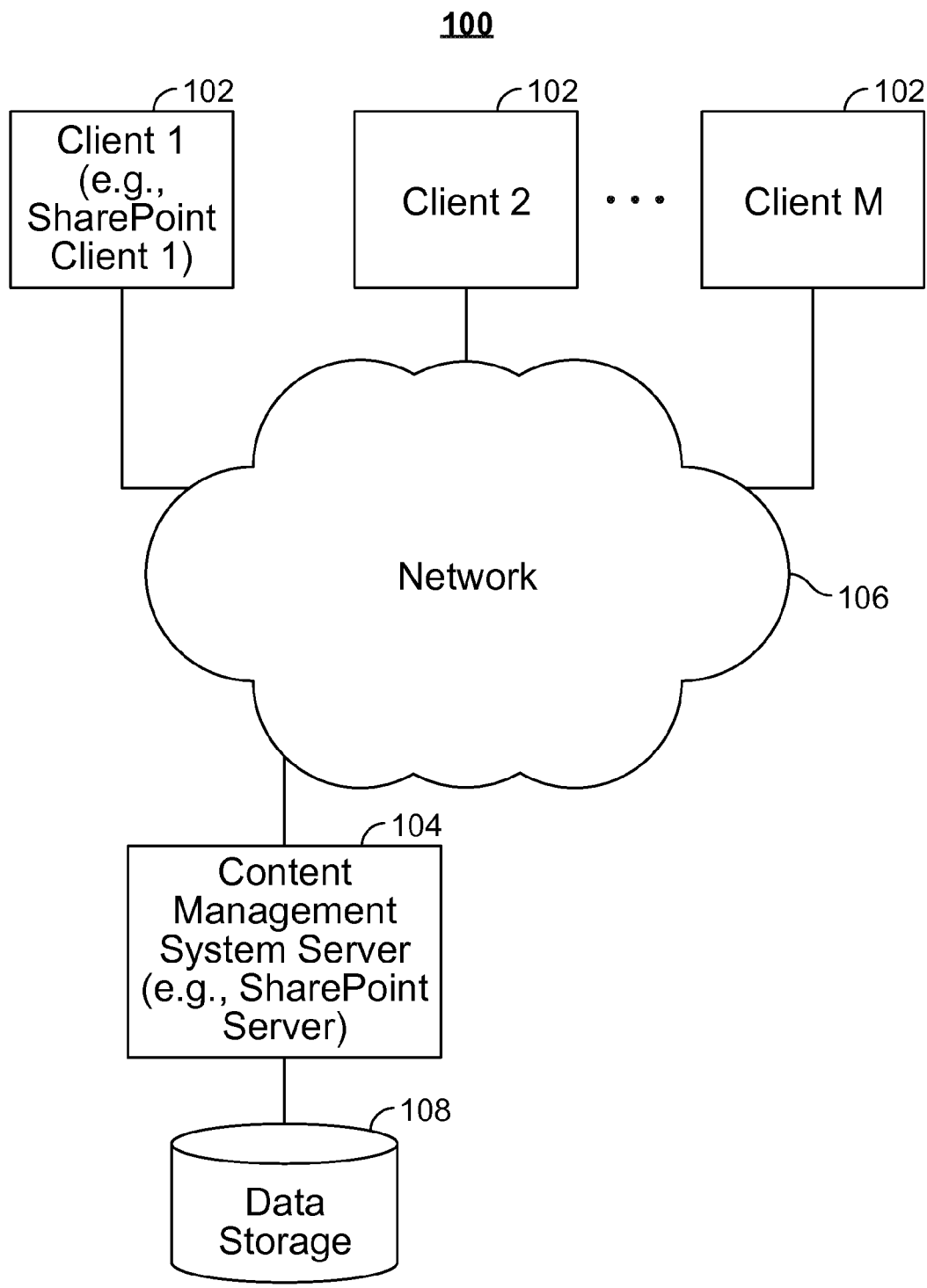
FIG. 1 is a block diagram illustrating an embodiment of a content management system 100.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Granular-level restore of a content management system, such as a SharePoint farm, is disclosed. In various embodiments, a virtual file system is created to expose backup data of a content management system stored in a backup data storage. In various embodiments, a selection of a portion of the backup data to be restored to the content management system is received. In various embodiments, the selected portion of the backup data is caused to be restored to the content management system. In some embodiments, the content management system is a SharePoint system. In some embodiments, the selected portion of the backup data to be restored to the content management system comprises an individual SharePoint object, such as a document, list, library, folder, attachment, and SharePoint site. In some embodiments, access of the virtual file system is provided to a granular search and recovery application.

Content management systems enable people to work efficiently together. For example, content management systems allow people belonging to an organization or a group to manage workflows in a collaborative environment, set up web sites to share information with others, manage documents from start to finish, or publish reports to help the organization make better decisions. Different types of content management systems include enterprise content management system, web content management system, web group content management system, and the like.

One example of content management systems is Microsoft SharePoint. SharePoint provides a multi-purpose platform for various applications. For example, SharePoint provides an infrastructure for an organization or a group to build its intranet and extranet portals and Internet sites. The infrastructure allows people belonging to the organization to share documents with other people within the organization, manage projects with partners, or publish information to customers. SharePoint can also be used as an enterprise collaboration tool. It allows people to share ideas and work together the way they want. SharePoint also provides search capabilities. In addition, SharePoint supports the managing and provisioning of social networking tools, enterprise search, business intelligence tooling, process/information integration, third-party developed solutions, and the like.

Microsoft SharePoint is used hereinafter as an example for the content management system described above. SharePoint is selected for illustration purposes only; accordingly, the present application is not limited to this specific example only.

FIG. 1 is a block diagram illustrating an embodiment of a content management system 100. As shown in FIG. 1, a client 102 (e.g., client 1) is connected to a content management system server 104 via a network 106. In some embodiments, client 102 may be in communication with content management system server 104 using a dedicated communication link, one or more networks, a local area network, a wide area network, a storage area network, the Internet, a wired network, a wireless network, and the like. Content management system server 104 is used to service multiple clients 102 (e.g., client 1 to client M) in parallel. The contents and data shared between clients 102 and managed by content management system server 104 are stored in a data storage 108, wherein the data may be organized in a plurality of content databases and configuration databases.

Continuing with the SharePoint illustrative example above, a plurality of SharePoint clients 102 are connected to a SharePoint server 104 via network 106. The contents and data shared between the plurality of SharePoint clients 102 and managed by SharePoint server 104 may include documents, images, movies, web pages, software project files and data, metadata, and the like. In some embodiments, the content databases and configuration databases located in data storage 108 are structured query language (SQL) databases.

The contents and data of content management system 100 can be lost after a data loss event. For example, the contents and data of content management system 100 may be accidently deleted by end-users, intentionally corrupted by malicious efforts of outsiders, or destroyed by a disaster, such as a fire or earthquake. Therefore, the contents and data of content management system 100 should be backed up periodically, such that they may be restored after a data loss event.

Figure 2:
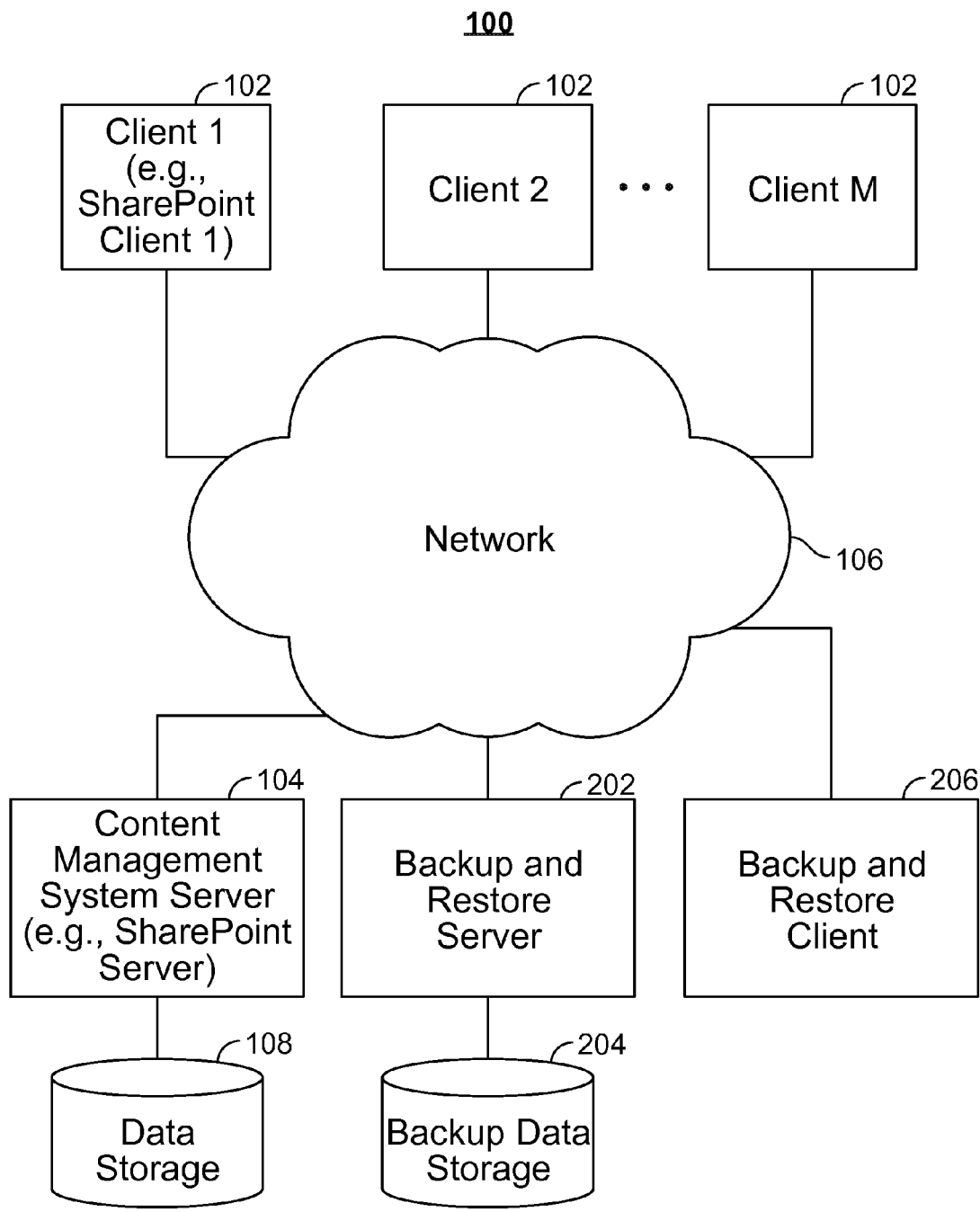
FIG. 2 is a block diagram illustrating an embodiment of a content management system connected with a backup and restore system.

FIG. 2 is a block diagram illustrating an embodiment of a content management system connected with a backup and restore system. One example of the backup and restore system is EMC Corporation's Avamar backup and restore system. As shown in FIG. 2, a backup and restore server 202 (e.g., an Avamar backup and restore server) is connected to content management system 100 via network 106. A system administrator of content management system 100 (e.g., a SharePoint administrator) may use a backup and restore client 206 (e.g., an Avamar client) to configure backup and restore server 202 to periodically backup the contents and data of content management system 100 into a backup data storage 204. For example, backup data storage 204 may include hard disks, solid state storages, virtual tape libraries (VTL), magnetic tapes, and the like.

Restoring lost data of content management system 100 can be performed in a number of ways. One approach is to perform an image-based full restore. In an image-based full-restore, all the content databases and configuration databases in data storage 108 are restored at once. For example, the entire backup of the various databases may be restored directly to content management system server 104 and data storage 108. However, during the full-restore, the availability of content management system 100 to the users of the system will be compromised. Since doing a full-restore is time-consuming, content management system 100 can potentially be down for a long time.

Another way to restore lost data of content management system 100 is a granular-level restore approach. In a granular-level restore, as will be described in greater details below, only the lost data items are located and restored back to content management system server 104 and data storage 108. For example, in our SharePoint illustrative example, SharePoint contents including documents, lists, libraries, folders, or sites can be individually restored.

In some embodiments, a backup process includes multiple passes. Such a backup process is referred to as a multi-pass backup process. In the first pass of the multi-pass backup process, an image-based backup is obtained and stored in backup data storage 204. This image-based backup can be used subsequently for restoring all the content databases and configuration databases in data storage 108 in an image-based full-restore. For example, an image-based full-restore can be used to recover from a disk crash or other disasters.

In the second pass of the multi-pass backup process, a granular-level backup is obtained and stored in backup data storage 204. This granular-level backup can be used subsequently for a granular-level restore. For example, a granular-level restore can be used to recover a few lost data items that were accidentally deleted by an end-user. In this case, the end-user will request the system administrator to restore a few lost data items, and the system administrator may choose to do a granular-level restore instead of an image-based full-restore, which requires more time and resources.

In some embodiments, a single-pass backup process may be used. In a single-pass backup process, only one single backup is obtained and stored in backup data storage 204. This single backup can be used subsequently for either an image-based full restore or a granular-level restore.

Both the multi-pass backup process and the single-pass backup process described above may include data deduplication features. During backup, data deduplication divides files or streams of data (e.g., files that are backed up) into chunks of data. Each chunk of data is assigned an identification, which may be calculated using cryptographic hash functions. The identification is known as a signature, or fingerprint, for the chunk of data. If the signature of the current chunk of data is identical to the signature corresponding to another chunk of data previously stored in a data storage (the latter implemented, for example, as a storage disk), then a duplicate is detected. Accordingly, the duplicated chunk of data is not stored again in the data storage; instead, the duplicated chunk of data is replaced by a reference or a link to the chunk of data previously stored in the data storage. Conversely, if the signature of the current chunk of data is different from all the signatures corresponding to chunks of data that have been previously stored in the data storage, then the current chunk of data is a unique new chunk of data and is stored in the data storage. The signature of the current chunk of data is also stored in an index. During restore, data deduplication reconstructs files that have been backed up by reading chunks of data stored in the data storage and concatenating them together. Whenever a link or a reference is found, the link or reference is replaced with the referenced data chunk.

Figure 3:
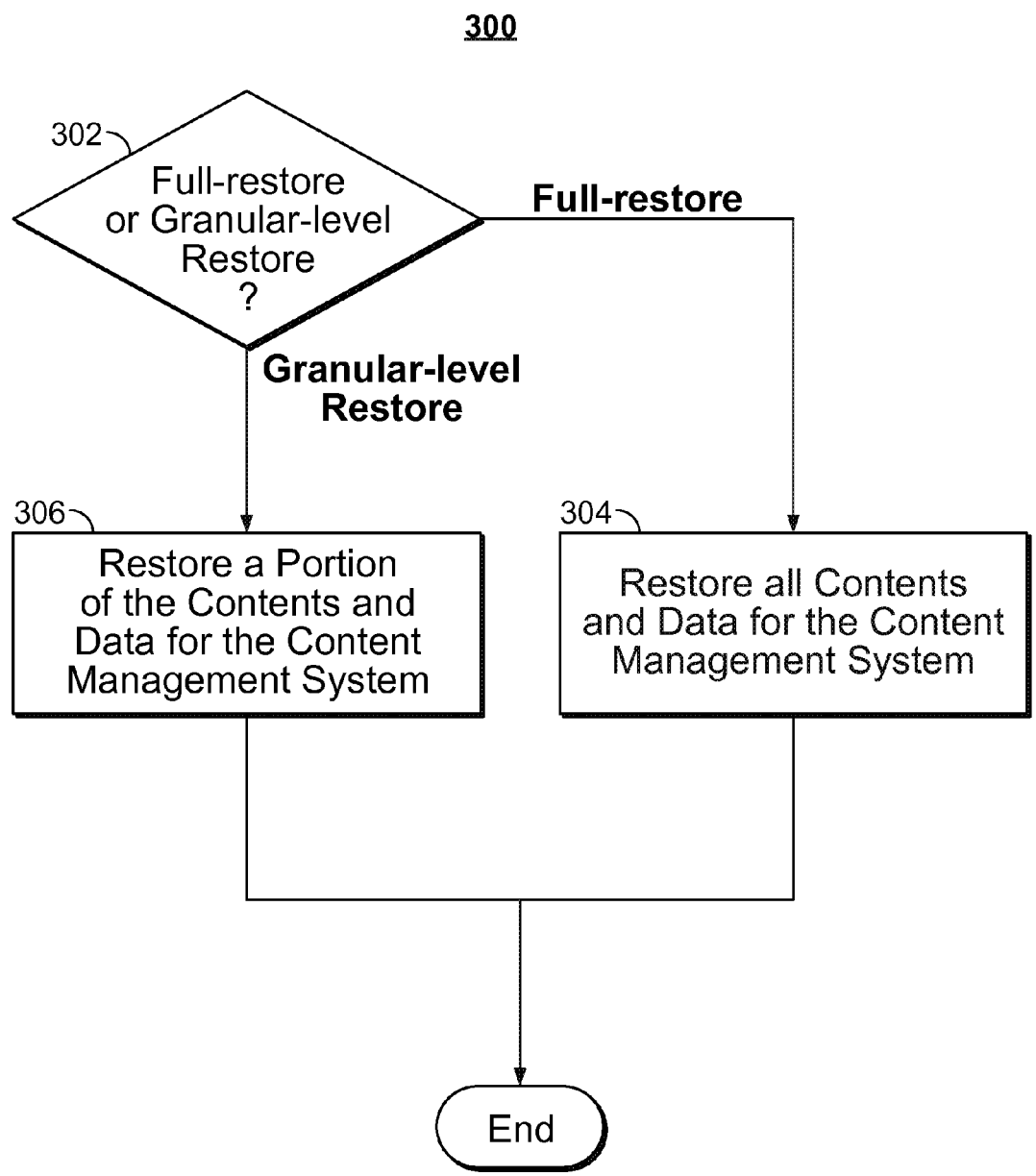
FIG. 3 is a flow chart illustrating an embodiment of a restore process 300.

FIG. 3 is a flow chart illustrating an embodiment of a restore process 300. At 302, either an image-based full-restore or a granular-level restore may be selected. For example, a SharePoint administrator may elect to do an image-based full-restore after a disk crash or disaster. At 304, an image-based full-restore is performed, and all contents and data for content management system 100 are restored. If the SharePoint administrator elects to do a granular-level restore at 302, then only a portion of the contents and data for content management system 100 is restored at 306.

Figure 4:
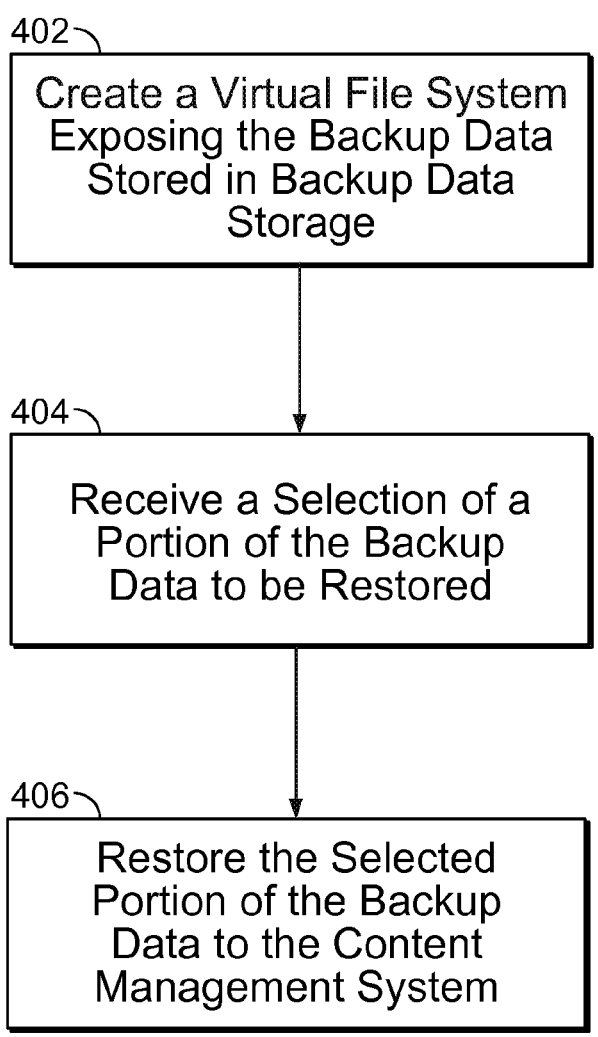
FIG. 4 is a flow chart illustrating an embodiment of a granular-level restore process 400.

FIG. 4 is a flow chart illustrating an embodiment of a granular-level restore process 400. In some embodiments, process 400 can be used to implement step 306 of process 300 as shown in FIG. 3.

At 402, a virtual file system (VFS) is created on a computer system on which backup and restore client 206 is run. The virtual file system exposes the backup data stored in backup data storage 204 as if the backup data are accessible on a local disk of the computer system. This is achieved by mounting the backup data stored in backup data storage 204 onto the virtual file system.

One example of the virtual file system is AxionFS in EMC Corporation's Avamar File System (AvFs). AxionFS is a virtual file system created on a computer system on which an Avamar client is run. The virtual file system exposes the backup data stored in the data storage of an Avamar backup and restore server as if the backup data are accessible on a local disk of the computer system. In some embodiments, AvFs utilizes EldoS Corporation's Callback File System (hereinafter referred to as EldoS CbFS) to create a virtual file system that exposes the backup data to a Microsoft Windows operating system.

Figure 5:
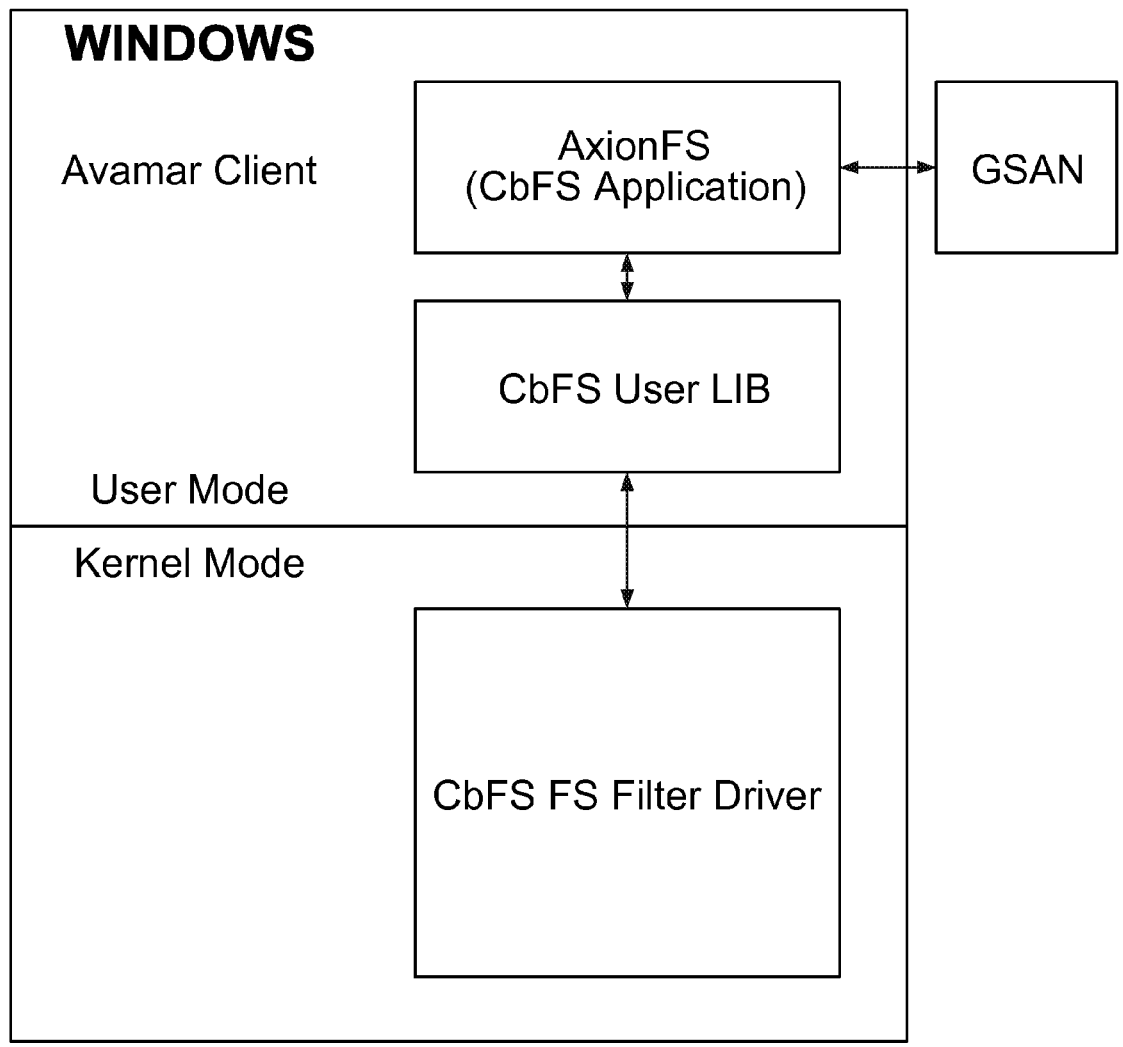
FIG. 5 is a block diagram illustrating an embodiment of an Avamar client with its virtual file system AxionFS.

FIG. 5 is a block diagram illustrating an embodiment of an Avamar client with its virtual file system AxionFS. As illustrated in FIG. 5, EldoS CbFS provides a kernel-mode filter driver to expose the disks, volumes, and file system objects of the data storage of an Avamar backup and restore server. EldoS CbFS also provides a user-mode CbFS library. This CbFS library allows developers to specify callback functions that are invoked by the EldoS kernel-mode driver when file system calls are being serviced. For example, EldoS CbFS provides directory enumeration callback functions, and AvFS would implement these functions to "fill-in" the directory contents with the directory elements from the Avamar backup.

In some embodiments, the backup data mounted on AxionFS are deduplicated. In some embodiments, the backup data mounted on AxionFS are readable and writeable by a user of a computer system running the Avamar client.

Because AxionFS exposes the backup data stored in the data storage of an Avamar backup and restore server as if the backup data are accessible on a local disk of the computer system, an application or end-user may access the backup data as files or folders on a local virtual disk. In some embodiments, a software recovery tool may be used to display and provide access to the backup data mounted on AxionFS. For example, Kroll Ontrack's PowerControls is a granular search and recovery tool that may be used to access SQL database files mounted on AxionFS. In some embodiments, Kroll Ontrack's PowerControls interprets the mounted backup data and displays a list of SharePoint objects that may be restored by a user. For example, PowerControls may display a list of items that can be restored individually, such as documents, lists, libraries, folders, attachments, and SharePoint sites. In some embodiments, PowerControls allows a user to granularly search for and restore individual SharePoint objects.

With continued reference to FIG. 4, a selection of a portion of the backup data to be restored to content management system server 104 and data storage 108 is received at 404. For example, a SharePoint administrator may select one or more SharePoint objects to be restored to SharePoint server 104 and data storage 108.

At 406, the selected portion of the backup data is restored back to content management system server 104 and data storage 108. For example, after Avamar client 206 has received the selection of SharePoint objects from a SharePoint administrator, Avamar client 206 may request Avamar backup and restore server 202 to restore those SharePoint objects back to SharePoint server 104 and data storage 108.

As illustrated above, granular-level restore using a virtual file system saves both time and resources compared to image-based full-restore. The virtual file system exposes the backup data stored in backup data storage 104 without actually retrieving the backup data. Backup data are read and transferred through the network on demand based on the specific needs of the end-users.

The backup and restore system disclosed in the present application can be used to backup and restore a SharePoint farm as well. A SharePoint farm includes more than one SharePoint servers. In some SharePoint farms, one or more SharePoint servers and one or more SQL servers are collectively used to provide SharePoint services bound together by a SharePoint configuration database. Some SharePoint farms include one or more SharePoint web servers, one or more SQL database servers, and one or more search content index servers.

Some of SharePoint's customization is stored not in databases, but in files in the file systems of the different SharePoint servers. Therefore, to fully backup a SharePoint farm, in addition to the various databases, file system data on different SharePoint servers are backed up as well.

To restore a SharePoint farm, a virtual file system for the entire SharePoint farm is created. The virtual file system aggregates the backup views of all the file systems of the different SharePoint servers into a single file system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for restoring a SharePoint farm, comprising:
   creating a virtual file system exposing backup data of a SharePoint farm stored in a backup data storage without retrieving the backup data from the backup data storage, wherein the SharePoint farm includes a plurality of SharePoint servers, each having a corresponding file system, each corresponding file system including a SharePoint customization file, and wherein creating the virtual file system further comprises aggregating backup views of the file systems corresponding to the plurality of SharePoint servers into a single file system;
   receiving via an interface associated with the virtual file system a selection of a portion of the backup data to be restored to the SharePoint farm; and
   causing the selected portion of the backup data to be granularly restored to the SharePoint farm without restoring unselected portions of the backup data.

2. The method of claim 1, wherein the selected portion of the backup data to be restored to the SharePoint farm comprises an individual SharePoint object.

3. The method of claim 2, wherein causing the individual SharePoint object to be granularly restored to the SharePoint farm comprises causing the individual SharePoint object to be granularly restored to an SQL database of the SharePoint farm.

4. The method of claim 2, wherein the individual SharePoint object comprises one of the following: a document, list, library, folder, attachment, and SharePoint site.

5. The method of claim 1, further comprising providing access of the virtual file system to a granular search and recovery application.

6. The method of claim 1, wherein the virtual file system is created on a computer system on which a backup and restore client runs.

7. The method of claim 6, wherein the computer system includes a Microsoft Windows operating system, and wherein the backup data is exposed to the Microsoft Windows operating system.

8. The method of claim 1, wherein the backup data comprises deduplicated backup data.

9. The method of claim 1, wherein the backup data is backed up by a single-pass backup process.

10. The method of claim 1, wherein creating the virtual file system further comprises providing read and write access to the exposed backup data.

11. The method of claim 1, wherein creating the virtual file system further comprises providing search functions of the exposed backup data.

12. A system for restoring a SharePoint farm, comprising:
   a processor configured to:
      create a virtual file system exposing backup data of a SharePoint farm stored in a backup data storage without retrieving the backup data from the backup data storage, wherein the SharePoint farm includes a plurality of SharePoint servers, each having a corresponding file system, each corresponding file system including a SharePoint customization file, and wherein creating the virtual file system further comprises aggregating backup views of the file systems corresponding to the plurality of SharePoint servers into a single file system;

receive via an interface associated with the virtual file system a selection of a portion of the backup data to be restored to the SharePoint farm; and cause the selected portion of the backup data to be granularly restored to the SharePoint farm without restoring one or more unselected portions of the backup data; and a memory coupled to the processor and configured to provide the processor with instructions.

13. The system of claim 12, wherein the selected portion of the backup data to be restored to the SharePoint farm comprises an individual SharePoint object.

14. The system of claim 12, wherein the virtual file system is further configured to provide read and write access to the exposed backup data.

15. The system of claim 12, wherein the virtual file system is further configured to provide search functions of the exposed backup data.

16. A computer program product for restoring a SharePoint farm, the computer program product being embodied in a non-transitory computer readable storage medium and comprising computer instructions for:

creating a virtual file system exposing backup data of a SharePoint farm stored in a backup data storage without retrieving the backup data from the backup data storage, wherein the SharePoint farm includes a plurality of SharePoint servers, each having a corresponding file system, each corresponding file system including a SharePoint customization file, and wherein creating the virtual file system further comprises aggregating backup views of the file systems corresponding to the plurality of SharePoint servers into a single file system;

receiving via an interface associated with the virtual file system a selection of a portion of the backup data to be restored to the SharePoint farm; and causing the selected portion of the backup data to be granularly restored to the SharePoint farm without restoring one or more unselected portions of the backup data.

17. The computer program product of claim 16, wherein the selected portion of the backup data to be restored to the SharePoint farm comprises an individual SharePoint object.

* * * * *